United States Patent [19]
Pickett et al.

[11] Patent Number: 5,872,943
[45] Date of Patent: *Feb. 16, 1999

[54] APPARATUS FOR ALIGNING INSTRUCTIONS USING PREDECODED SHIFT AMOUNTS

[75] Inventors: James K. Pickett; Thang M. Tran, both of Austin, Tex.

[73] Assignee: Advanced Micro Devices, Inc.

[*] Notice: This patent issued on a continued prosecution application filed under 37 CFR 1.53(d), and is subject to the twenty year patent term provisions of 35 U.S.C. 154(a)(2).

[21] Appl. No.: 690,382

[22] Filed: Jul. 26, 1996

[51] Int. Cl.⁶ ........................................... G06F 9/312
[52] U.S. Cl. .................. 395/380; 395/388; 395/391; 711/125
[58] Field of Search .................... 395/380, 388, 395/389, 391, 452; 711/125

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,442,760 | 8/1995 | Rustad et al. .............................. 395/391 |
| 5,488,710 | 1/1996 | Sato et al. ................................ 395/452 |
| 5,513,330 | 4/1996 | Stiles ....................................... 395/380 |
| 5,586,276 | 12/1996 | Grochowski et al. ................... 395/380 |
| 5,625,787 | 4/1997 | Mahin et al. ............................ 395/380 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrin Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," Byte, Jan. 1996, 4 pages.

*Primary Examiner*—Parshotam S. Lall
*Assistant Examiner*—Gautam R. Patel
*Attorney, Agent, or Firm*—Conley, Rose & Tayon, PC; B. Noel Kivlin; Lawrence J. Merkel

[57] ABSTRACT

A predecode unit within a microprocessor predecodes a cache line of instruction bytes for storage within the instruction cache of the microprocessor. The predecode unit produces multiple shift amounts, each of which identify the beginning of a particular instruction within the instruction cache line. The shift amounts are stored in the instruction cache with the instruction bytes, and are conveyed when the instruction bytes are fetched for execution by the microprocessor. An instruction alignment unit decodes the shift amounts to locate instructions within the fetched instruction bytes. Each shift amount directly identifies a corresponding instruction for dispatch, and therefore decoding the shift amount directly results in controls for shifting the instruction bytes such that the identified instruction is conveyed to a corresponding issue position. The number of shift amounts stored may be equal to the number of issue positions within the microprocessor. The instruction alignment unit scans the start and end byte predecode data (which is also provided by the predecode unit and stored in the instruction cache) to detect any additional instructions within the cache line (e.g. instructions not identified by the shift amounts). Additional shift amounts are generated and used by the instruction alignment unit to dispatch instructions during subsequent clock cycles.

24 Claims, 8 Drawing Sheets

APPARATUS FOR ALIGNING INSTRUCTIONS USING PREDECODED SHIFT AMOUNTS

BACKGROUND OF THE INVENTION

1. Field of the Invention

This invention relates to the field of superscalar microprocessors and, more particularly, to aligning variable byte-length instructions to issue positions within superscalar microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

A popular microprocessor architecture is the x86 microprocessor architecture. Due to the widespread acceptance of the x86 microprocessor architecture in the computer industry, superscalar microprocessors designed in accordance with this architecture are becoming increasingly common. The x86 microprocessor architecture specifies a variable byte-length instruction set in which different instructions may occupy differing numbers of bytes. For example, the 80386 and 80486 processors allow a particular instruction to occupy a number of bytes between 1 and 15. The number of bytes occupied depends upon the particular instruction as well as various addressing mode options for the instruction.

Because instructions are variable-length, locating instruction boundaries is complicated. The length of a first instruction must be determined prior to locating a second instruction subsequent to the first instruction within an instruction stream. However, the ability to locate multiple instructions within an instruction stream during a particular clock cycle is crucial to superscalar microprocessor operation. As operating frequencies increase (i.e. as clock cycles shorten), it becomes increasingly difficult to locate multiple instructions simultaneously.

Various predecode schemes have been proposed in which a predecoder appends information regarding each instruction byte to the instruction byte as the instruction is stored into the cache. As used herein, the term "predecoding" is used to refer to generating instruction decode information prior to storing the corresponding instruction bytes into an instruction cache of a microprocessor. The generated information may be stored with the instruction bytes in the instruction cache. For example, an instruction byte may be indicated to be the beginning or end of an instruction. By scanning the predecode information when the corresponding instruction bytes are fetched, instructions may be located without actually attempting to decode the instruction bytes. The predecode information may be used to decrease the amount of logic needed to locate multiple variable-length instructions simultaneously. Unfortunately, these schemes become insufficient at high clock frequencies as well. A method for locating multiple instructions during a clock cycle at high frequencies is needed.

SUMMARY OF THE INVENTION

The problems outlined above are in large part solved by a microprocessor in accordance with the present invention. A predecode unit within the microprocessor predecodes a cache line of instruction bytes received from the main memory for storage within the instruction cache of the microprocessor. Among other information, the predecode unit produces multiple shift amounts, each of which identify the beginning of a particular instruction within the instruction cache line. The shift amounts are stored in the instruction cache with the instruction bytes, and are conveyed when the instruction bytes are fetched for execution by the microprocessor. An instruction alignment unit decodes the shift amounts to locate instructions within the fetched instruction bytes. The logic used to decode the shift amounts is substantially smaller and faster than logic to decode the instruction bytes themselves. Additionally, the logic may be significantly smaller and faster than logic for scanning predecode information such as start tags and end tags. Each shift amount directly identifies a corresponding instruction for dispatch, and therefore decoding the shift amount directly results in controls for shifting the instruction bytes such that the identified instruction is conveyed to a corresponding issue position. Advantageously, multiple instructions may be located by decoding the multiple shift amounts simultaneously. Since very little logic is employed in decoding the shift amounts, the instruction alignment process may be performed at higher clock frequencies than those achievable using predecode schemes which require additional logic (such as scanning start and end byte information).

In one embodiment, the number of shift amounts stored is equal to the number of issue positions within the microprocessor. More instructions may be stored within an instruction cache line than the number of instructions which may be concurrently dispatched. Therefore, the instruction alignment unit scans the start and end byte predecode data (which is also provided by the predecode unit and stored in the instruction cache) to detect any additional instructions within the cache line. Additional shift amounts are generated and used by the instruction alignment unit to dispatch instructions during the subsequent clock cycle. Still more shift amounts are generated during subsequent clock cycles if more instructions reside within the cache line, until all the instructions within the cache line have been dispatched. Additionally, the embodiment receives a branch target offset if the instruction bytes are fetched as the result of a branch instruction. The shift amounts used to dispatch instructions are compared to the branch target offset. Any shift amounts which are numerically less than the branch target offset identify instructions which are prior to the target of the branch instruction within the instruction cache line. Therefore, the corresponding instructions are cancelled from the instruction processing pipeline of the microprocessor.

Broadly speaking, the present invention contemplates a method for aligning instructions. A cache line of instruction bytes is predecoded to generate a plurality of shift amounts upon receipt of the cache line of instruction bytes for storage in an instruction cache. Each one of the plurality of shift amounts identifies a particular instruction within the cache line of instruction bytes. The cache line of instruction bytes is stored in the instruction cache, along with the plurality of shift amounts. A plurality of instructions are selected from the cache line of instructions for dispatch to a plurality of issue positions in response to the plurality of shift amounts.

The present invention further contemplates an apparatus for aligning instructions, comprising an instruction cache and an instruction alignment unit. The instruction cache is configured to store a cache line of instruction bytes and a corresponding plurality of shift amounts. Each one of the plurality of shift amounts identifies an instruction within the cache line of instruction bytes. Coupled to receive the cache line of instruction bytes and the plurality of shift amounts, the instruction alignment unit is configured to select a plurality of instructions for dispatch in response to the plurality of shift amounts.

The present invention still further contemplates a microprocessor comprising a predecode unit, an instruction cache, and an instruction alignment unit. The predecode unit is configured to generate a plurality of shift amounts corresponding to a cache line of instruction bytes. Coupled to the predecode unit, the instruction cache is configured to store the cache line of instruction bytes and the plurality of shift amounts. Coupled to the instruction cache, the instruction alignment unit is configured to select a plurality of instructions from the cache line of instruction bytes for dispatch in response to the plurality of shift amounts.

BRIEF DESCRIPTION OF THE DRAWINGS

Other objects and advantages of the invention will become apparent upon reading the following detailed description and upon reference to the accompanying drawings in which.

Figure 1:
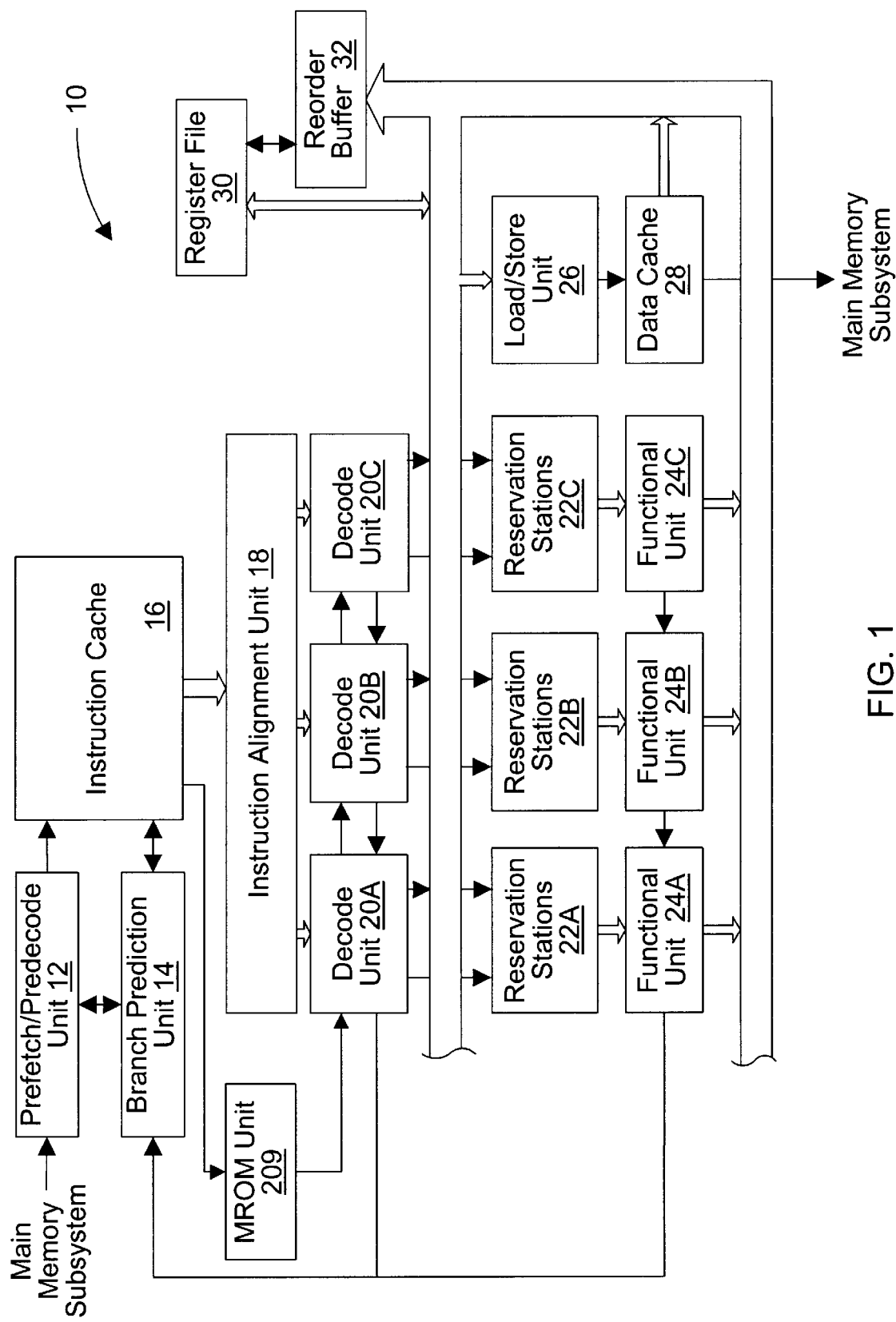
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction cache 16 is configured to store predecode information as well as instruction bytes. The predecode information includes multiple shift amounts, each of which identify the beginning of an instruction within a particular instruction cache line. When the instruction cache line is fetched from instruction cache 16, the corresponding shift amounts are conveyed as well. Instruction alignment unit 18 receives the shift amounts and uses the amounts to shift instructions to fixed issue positions formed by decode units 20, reservation stations 22, and functional units 24. Advantageously, instruction alignment unit 18 need not scan the instruction bytes themselves nor any start/end byte tags associated with the instruction bytes. Instead, a first shift amount directly identifies a first instruction within the instruction cache line for dispatch to a first issue position. Similarly, a second shift amount directly identifies a second instruction within the instruction cache line for dispatch to a second issue position, etc. The shift amounts may be decoded using very few levels of logic, allowing instruction alignment to be performed at extremely high frequencies.

In one embodiment, the number of shift amounts stored is equal to the number of issue positions within microprocessor 10. In this manner, up to the maximum number of concurrently dispatchable instructions from an instruction cache line may be identified. If an instruction cache line includes more than the maximum number of dispatchable instructions, instruction alignment unit 18 is configured to scan the remaining predecode data (e.g. start and end bits) to locate additional instructions within the instruction cache line. Additional shift amounts are thereby generated, and the additional shift amounts are used in the subsequent clock cycle for routing the additional instructions in the same fashion as the original shift amounts are used.

As used herein, the term "shift amount" refers to a value used to identify the beginning of an instruction within the instruction cache line. The shift amount is effectively an offset identify the location within the line of the first byte of a corresponding instruction. The shift amount may be used by instruction alignment unit 18 to shift the instruction bytes fetched from the instruction cache line such that the identified byte is aligned to a corresponding issue position. Still further, the term "cache line" refers to a contiguous plurality of bytes which are manipulated by a cache as a unit. For example, storage space is allocated and deallocated within the cache in units of cache lines.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

Start bits 10000
End bits 00001
Functional bits 11000

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. Instruction alignment unit 18 aligns an instruction to each of decode units 20. In one embodiment, instruction alignment unit 18 aligns instructions to a set of aligned issue positions corresponding to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
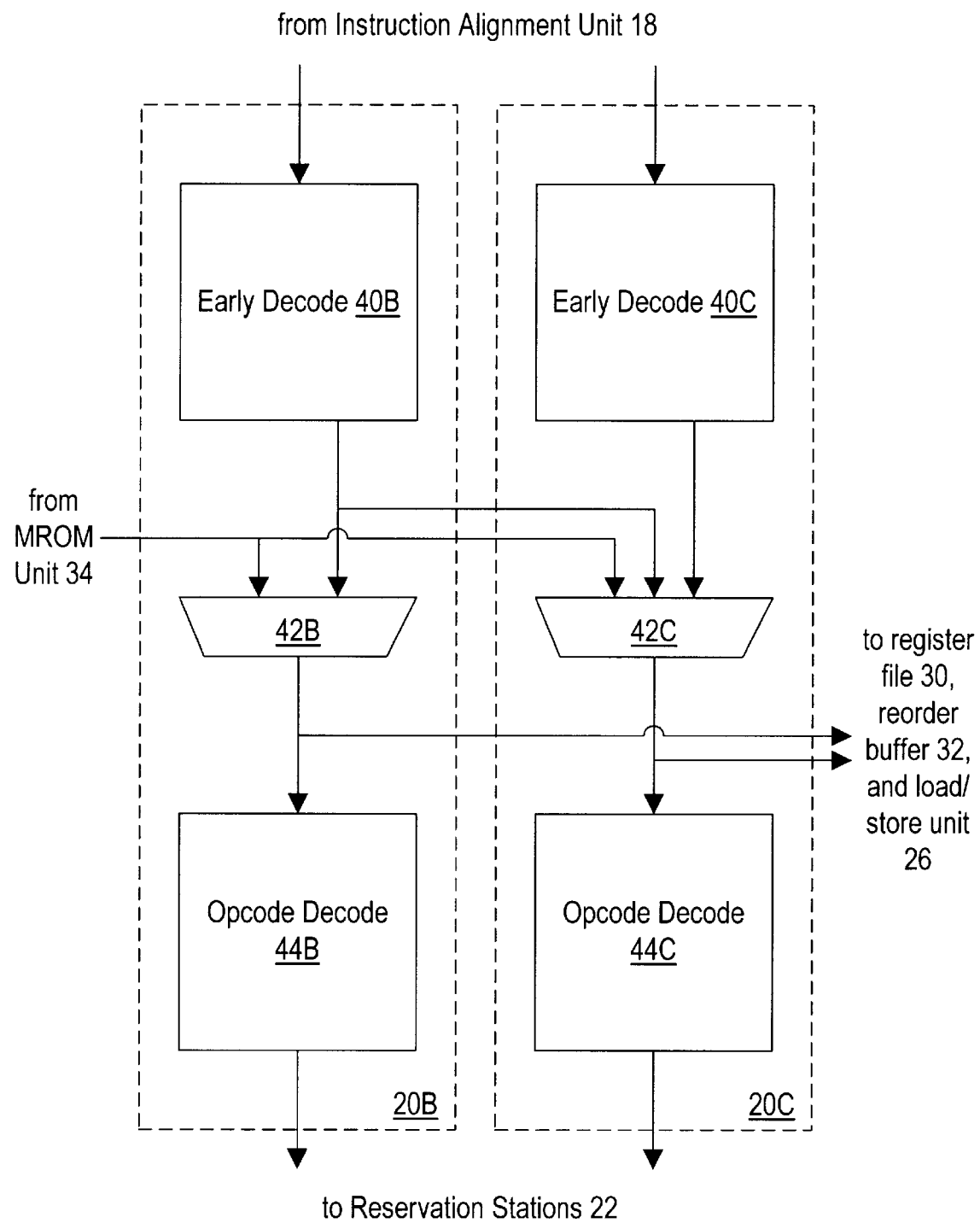
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
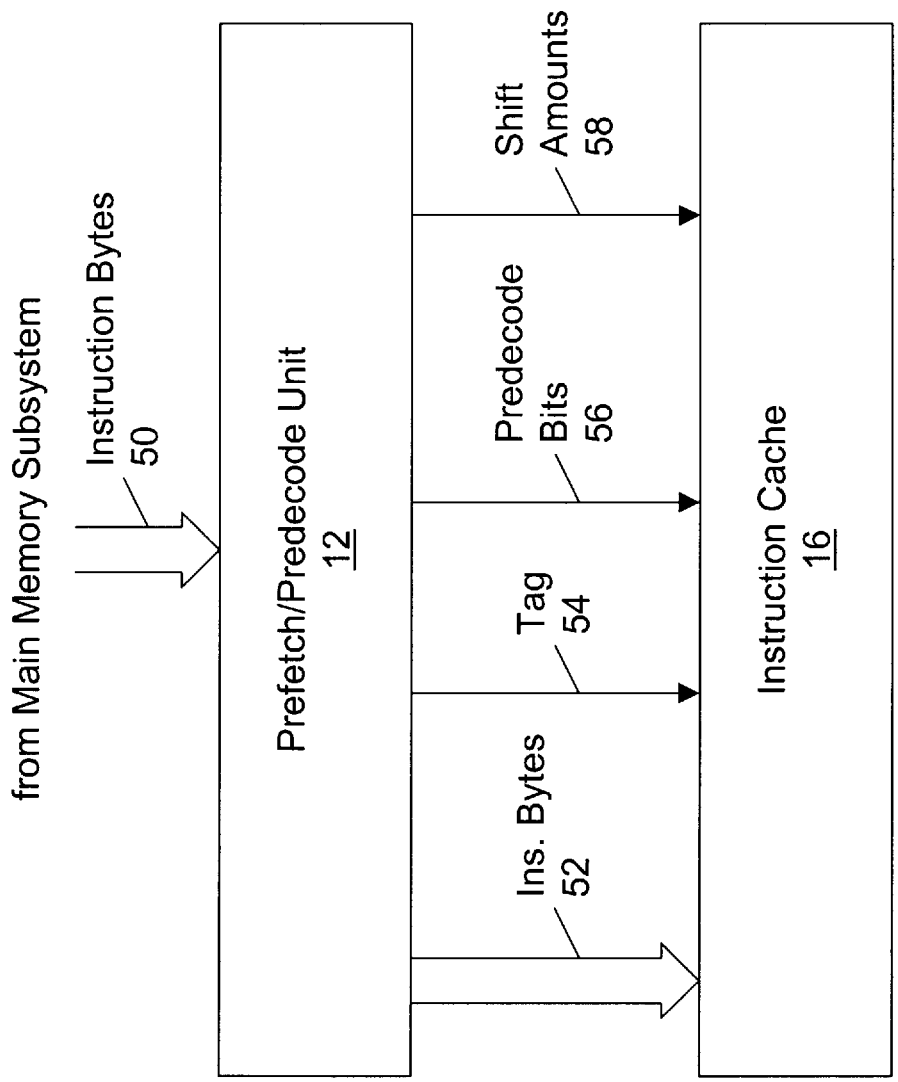
FIG. 3 is a block diagram of a predecode unit and an instruction cache shown in FIG. 1, highlighting interconnection there between according to one embodiment of the microprocessor shown in FIG. 1.

Turning next to FIG. 3, a block diagram of prefetch/predecode unit 12 and instruction cache 16 is shown to highlight interconnection there between according to one embodiment of microprocessor 10. Other embodiments may employ similar or dissimilar interconnections. Additional interconnect may also be included for additional functionality.

Prefetch/predecode unit 12 receives instruction bytes from main memory in response to instruction cache misses. The instruction bytes are conveyed upon a first instruction bytes bus 50. Prefetch/predecode unit 12 predecodes the instruction bytes, forming the start, end, and functional bit values for each instruction byte in accordance with the above discussion. Still further, prefetch/predecode unit 12 notes the offsets from the first byte within the instruction cache line to the first byte of the instructions located within the line. Shift amounts are noted for up to the first "N" instructions located within the instruction cache line, where "N" is the number of shift amounts which instruction cache 16 is configured to store with respect to a particular instruction cache line. In one embodiment, "N" is the number of issue positions within microprocessor 10, although other embodiments may employ dissimilar numbers of shift amounts.

In one embodiment, prefetch/predecode unit 12 predecodes instructions one at a time until the entire cache line is predecoded. The cache line is then stored into instruction cache 16. Prefetch/predecode unit 12 may be configured to forward instructions and corresponding predecode data to instruction alignment unit 18 while predecode is being performed if the instruction cache line is currently being fetched by microprocessor 10. In this manner, instructions may be provided for execution prior to the completion of predecode.

Upon completion of predecode of the instruction cache line, prefetch/predecode unit 12 forwards instruction bytes, a cache tag, and predecode data to instruction cache 16 for storage. Instruction bytes are conveyed upon a second instruction bytes bus 52. The corresponding tag information is conveyed upon a tag bus 54. Start, end, and functional bits are conveyed upon predecode bits bus 56; while the shift amounts generated during predecode are conveyed upon a shift amounts bus 58. Instruction cache 16 allocates an instruction cache line for storing the conveyed information, and stores the information therein. It is noted that instruction cache 16 may form the tag information internally in alternative embodiments. Tag bus 54 is eliminated in such embodiments.

Figure 4:
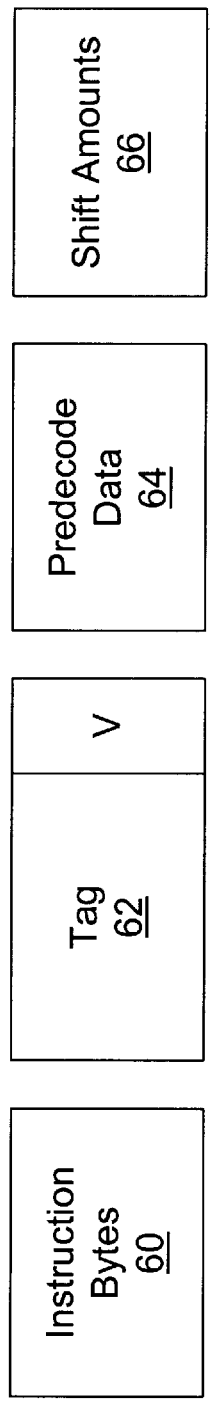
FIG. 4 is a diagram depicting information store in an instruction cache line according to one embodiment of the instruction cache.

Turning now to FIG. 4, a diagram of the information stored in instruction cache 16 for an instruction cache line is shown according to one exemplary embodiment of instruction cache 16. Additional, supplementary, or similar information may be stored in other embodiments.

Instruction cache 16 includes the following fields within an instruction cache line for the embodiment of FIG. 4: an instruction bytes field 60, a tag field 62, a predecode data field 64, and a shift amounts field 66. Instruction bytes field 60 includes sufficient storage space for storing the instruction bytes of the cache line. In one embodiment, an instruction cache line includes 32 instruction bytes. However, any number of instruction bytes may comprise an instruction cache line in various embodiments. Tag field 62 stores the address tag identifying the instruction cache line within main memory. Additionally, a valid bit is included within tag field 62 to indicate the validity or invalidity of the instruction cache line. Predecode data field 64 stores the start, end, and functional bits for each instruction byte. Finally, shift amounts field 66 stores the shift amounts generated by prefetch/predecode unit 12. Shift amounts field 66 includes a subfield for each shift amount generated by prefetch/predecode unit 12.

When a cache line of instruction bytes are fetched from instruction cache 16, the information stored in instruction bytes field 60, predecode data field 64, and shift amounts field 66 is conveyed to instruction alignment unit 18. The information in tag field 62 is used by instruction cache 16 to determine if the instruction fetch is a hit or a miss in instruction cache 16.

Figure 5:
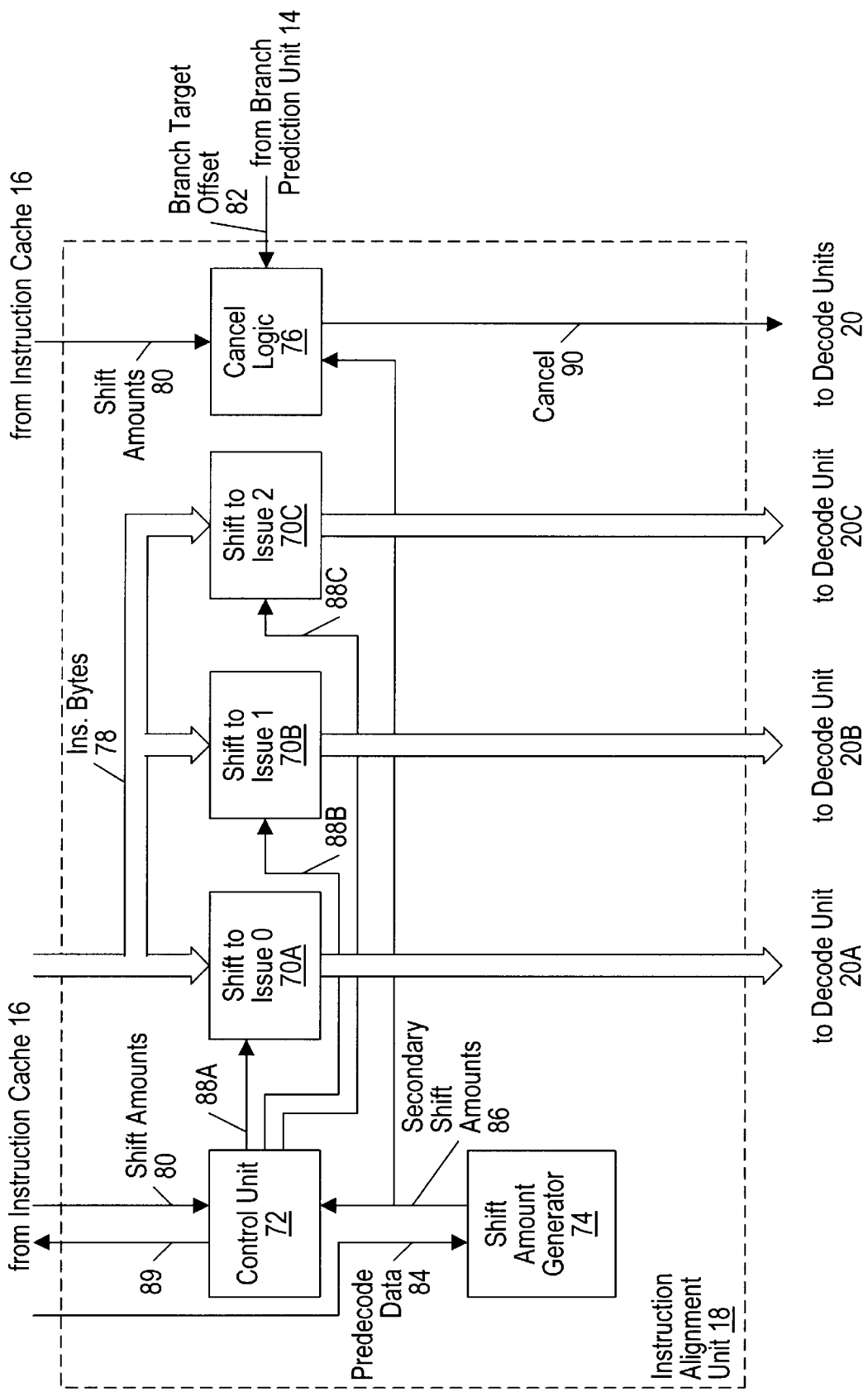
FIG. 5 is a block diagram of one embodiment of an instruction alignment unit shown in FIG. 1.

Turning next to FIG. 5, a block diagram of one embodiment of instruction alignment unit 18 is shown. Other embodiments of instruction alignment unit 18 are contemplated. As shown in FIG. 5, instruction alignment unit 18 includes shift to issue units 70A, 70B, and 70C, a control unit 72, a shift amount generator 74, and a cancel logic block 76. Shift to issue units 70 are coupled to a third instruction bytes bus 78 (upon which the instruction bytes stored in the instruction cache line are conveyed) from instruction cache 16 as well as to control unit 72. Shift to issue units 70 each provide an instruction to a corresponding decode unit 20. Control unit 72 and cancel logic block 76 are coupled to a shift amounts bus 80 from instruction cache 16. (For clarity in the drawing, shift amounts bus 80 is shown separately connected to control unit 72 and cancel logic block 76, although a common bus may be coupled to both blocks). The shift amounts stored in shift amounts field 66 are conveyed upon shift amounts bus 80 when the corresponding instruction cache line is fetched. Cancel logic block 76 is further coupled to a branch target offset bus 82 from branch prediction unit 14. Shift amount generator 74 is coupled to a predecode data bus 84 from instruction cache 16, and provides additional shift amounts upon a secondary shift amounts bus 86 to control unit 72.

Control unit 72 is configured to decode the shift amounts provided upon shift amounts bus 80, generating controls signals for shift to issue units 70. Control unit 72 decodes a first shift amount from shift amounts bus 80 to generate controls for shift to issue unit 70A, asserting the controls upon a controls bus 88A coupled thereto. Similarly, control unit 72 decodes a second shift amount from shift amounts bus 80 to generate controls for shift to issue unit 70B, asserting the controls upon a controls bus 88B. Finally, a third shift amount is used by control unit 72 to generate controls upon a controls bus 88C for shift to issue unit 70C.

Shift to issue units 70 select instruction bytes under the control of control buses 88 for conveyance to corresponding issue positions including decode units 20. In one embodiment, shift to issue units 70 shift the cache line of instruction bytes such that the byte identified by the corresponding shift amount is conveyed to the corresponding decode unit, as well as a fixed number of subsequent bytes. In one specific embodiment, eight bytes are conveyed to each decode unit, beginning with the byte identified by the corresponding shift amount.

Concurrent with control unit 72 decoding the shift amounts received from instruction cache 16, shift amount generator 74 generates additional shift amounts corresponding to additional instructions within the cache line of instructions. The additional instructions are not located by the shift amounts provided by instruction cache 16. Shift amount generator 74 generates the shift amounts by examining the start and end bits provided by instruction cache 16 upon predecode data bus 84. Additionally, predecode data bus 84 may convey the last shift amount (e.g. the shift amount corresponding to shift to issue unit 70C). Shift amount generator 74 scans the predecode data corresponding to instruction bytes subsequent to the instruction identified for shift to issue unit 70C to detect any additional instructions within the cache line of instructions.

The additional shift amounts thus generated are conveyed upon secondary shift amounts bus 86 to control unit 72. During clock cycles in which valid additional shift amounts are generated, control unit 72 captures the additional shift amounts and uses the amounts for generating control signals during the subsequent clock cycle. The same cache line of instruction bytes is presented during the subsequent clock cycle as well. The set of instruction bytes may be stored within instruction alignment unit 18 (not shown), or control unit 72 may signal instruction cache 16 to present the same set of instruction bytes again during the subsequent clock cycle via a signal 89. If instruction alignment unit 18 stores the instruction bytes, signal 89 may still be implemented to inform instruction cache 16 that any new cache line of instruction bytes which may be conveyed during the subsequent clock cycle are ignored in order to complete dispatch of the current cache line of instruction bytes.

Shift amount generator 74 generates a number of additional shift amounts equal to the number of shift amounts conveyed upon shift amounts bus 80. If still more additional shift amounts are needed to complete dispatch of the instructions within the instruction cache line, additional clock cycles are used. Shift amount generator 74 signals control unit 72 during the clock cycle that shift amounts are generated for the last of the instructions within the cache line of instructions are generated. Control unit 72 then allows instruction cache 16 to convey instruction bytes corresponding to another cache line of instructions fetched in accordance with the instruction sequence begin executed.

A cache line of instructions may be the target of a branch instruction (i.e. a branch instruction is executed having a target address within the cache line of instructions). When such a cache line of instructions is conveyed to instruction alignment unit 18, a branch target offset identifying the byte within the cache line of instructions which is the target of the branch instruction is conveyed to instruction alignment unit 18 from branch prediction unit 14. Instructions which are prior to the byte identified by the branch target offset should not be dispatched. Instructions which are prior to the branch target byte are identified by shift amounts which are numerically less than the branch target offset. Cancel logic block 76 compares the branch target offset to the shift amounts conveyed by instruction cache 16 as well as to the secondary shift amounts generated by shift amount generator 74. If a shift amount is numerically less than the branch target offset, then cancel logic block 76 asserts a cancel signal upon a cancel bus 90 to the corresponding decode unit 20. Upon receipt of an asserted cancel signal, the receiving decode unit 20 discards the instruction dispatched thereto. In this manner, instructions which are not dispatched (because they are not within the predicted instruction stream) are discarded by decode units 20 and do not progress further within the instruction processing pipeline of microprocessor 10. Cancel bus 90 may comprise a cancel line coupled to each decode unit 20A–20C. If the instruction dispatched to that decode unit 20A–20C is to be discarded, cancel logic block 76 asserts the cancel signal upon the corresponding cancel line.

It is noted that branch prediction unit 14 may provide both a start pointer and an end pointer upon branch target offset bus 82. The start pointer and end pointer define a region of bytes within the cache line which include the instructions to be dispatched. The start pointer indicates the first instruction within the line to be dispatched (i.e. the start pointer is the offset of a branch target address). The end pointer is the offset of the last byte of a branch instruction which is predicted taken (i.e. instructions subsequent to the branch instruction within the instruction cache line are not within the predicted instruction stream). Instructions corresponding to shift amounts which are numerically less than the start pointer or numerically greater than the end pointer are cancelled. Still further, the shift amounts which are stored in instruction cache 16 may be updated if instructions are cancelled due to shift amounts being numerically less than the start pointer. In other words, the shift amounts identify the first N instructions within the instruction cache line beginning with the instruction identified by the start pointer. The update may occur at any time, but an exemplary embodiment may perform the update upon retirement of the corresponding instructions. In this manner, updates due to incorrect speculative fetching are not performed. It is further noted that, due to the cancellation of instructions which are prior to the start pointer, a bubble in the instruction processing pipeline is introduced.

Figure 6:
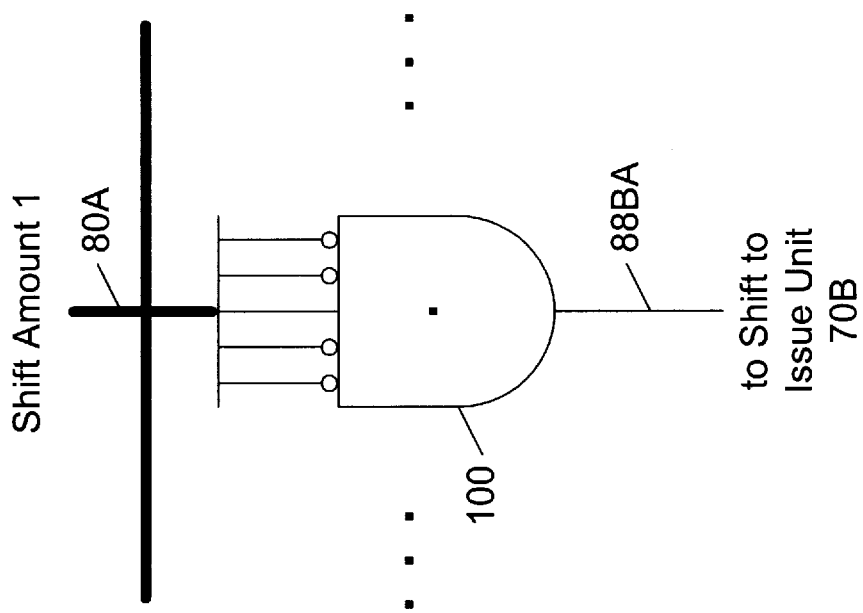
FIG. 6 is a diagram of exemplary logic which may be employed by a control unit shown in FIG. 5.

FIG. 6 shows an exemplary decode circuit which may be used within control unit 72. Many other implementations are contemplated. For example, although an AND gate 100 is shown in FIG. 6, a NAND gate or any other combinatorial logic may be used in place of AND gate 100. AND gate 100 receives a portion 80A of shift amount bus 80 upon which the shift amount corresponding to shift to issue unit 70B is conveyed. In the embodiment of FIG. 6, each shift amount comprises five bits for encoding offsets within a 32 byte cache line. AND gate 100 detects the case in which portion 80A conveys a shift amount of 04 (in hexadecimal). Other gates may be used to detect other shift amounts. When AND gate 100 receives a shift amount of 04, AND gate 100 asserts an output signal 88BA (a portion of control bus 88B). When shift to issue block 70B receives output signal 88BA in the asserted state, shift to issue unit 70B selects byte four of the cache line of instruction bytes and subsequent instruction bytes for conveyance to decode unit 20B. For example, shift to issue unit 70B may comprise multiplexors for selecting each instruction byte conveyed to decode unit 20B. Output signal 88BA may be used as a control signal to the multiplexors.

FIG. 6 illustrates that very little logic may be employed for decoding the shift amounts into control signals for shift to issue units 70. Advantageously, instruction alignment unit 18 may be capable of high frequency operation. A microprocessor employing the apparatus described herein may be capable of higher operating frequencies than a microprocessor employing conventional alignment techniques.

Figure 7:
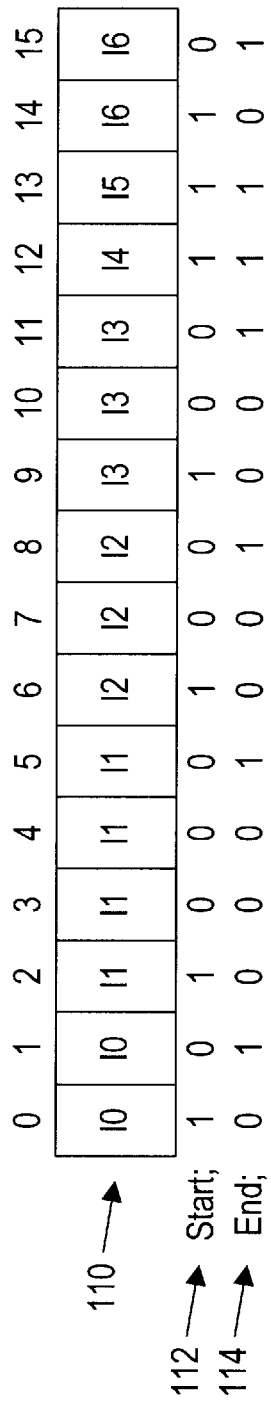
FIG. 7 is an example of the operation of the microprocessor shown in FIG. 1 using shift amounts stored in the instruction cache.

Turning now to FIG. 7, an example showing a portion 110 of an exemplary cache line of instructions is shown to illustrate operation of instruction alignment unit 18 in response to the shift amounts described above. Byte positions within portion 110 are numbered between 0 and 15. Byte position 0 is first in program order, followed by byte position 1, etc. The symbol "I0" within a byte position indicates that the byte is part of an instruction I0. Similarly, the symbols I1, I2, I3, I4, I5, and I6 indicate bytes within instructions I1, I2, I3, I4, I5, and I6, respectively.

During a first clock cycle, denoted as cycle 1 in FIG. 7, portion 110 is received by instruction alignment unit 18. Additionally, predecoded shift amounts are received during cycle 1. Since instructions I0, I1, and I2 are the first three instructions within portion 110 and microprocessor 10 as shown in FIG. 1 includes three issue positions, the shift amounts stored with the instruction cache line indicate the beginning of instructions I0, I1, and I2, respectively. Therefore, the shift amounts used during cycle 1 are 0 (for instruction I0), 2 (for instruction I1), and 6 (for instruction I2). Instructions I0, I1, and I2 are thereby dispatched to decode units 20A, 20B, and 20C, respectively.

While control unit 72 generates control signals for shift to issue units 70, shift amount generator 74 generates additional shift amounts based upon the predecode data corresponding to portion 110. Beneath portion 110 in FIG. 7, the start and end bits for each byte are listed (reference numerals 112 and 114, respectively). Since the last shift amount received from instruction cache 16 is 6, shift amount generator 74 begins scanning with byte 7 of portion 110. Shift amount generator 74 detects start bits at byte 9, byte 12, and byte 13. Therefore, additional shift amounts of 9, 12, and 13 are generated and conveyed to control unit 72.

During cycle 2, control unit 72 and shift to issue units 70 dispatch instructions I3, I4, and I5 in response to the shift amounts provided by shift amount generator 74. Additionally, shift amount generator 74 continues scanning the predecode data associated with portion 110. Instruction I6 (having a corresponding shift amount of 14) is detected. However, no other valid instructions are detected. Therefore, invalid shift amounts are conveyed corresponding to shift to issue units 70B–70C. Control unit 72 dispatches instruction I6 during cycle 3 in response to the one valid shift amount. Additional instruction bytes from a subsequent instruction cache line may then be processed.

Figure 8:
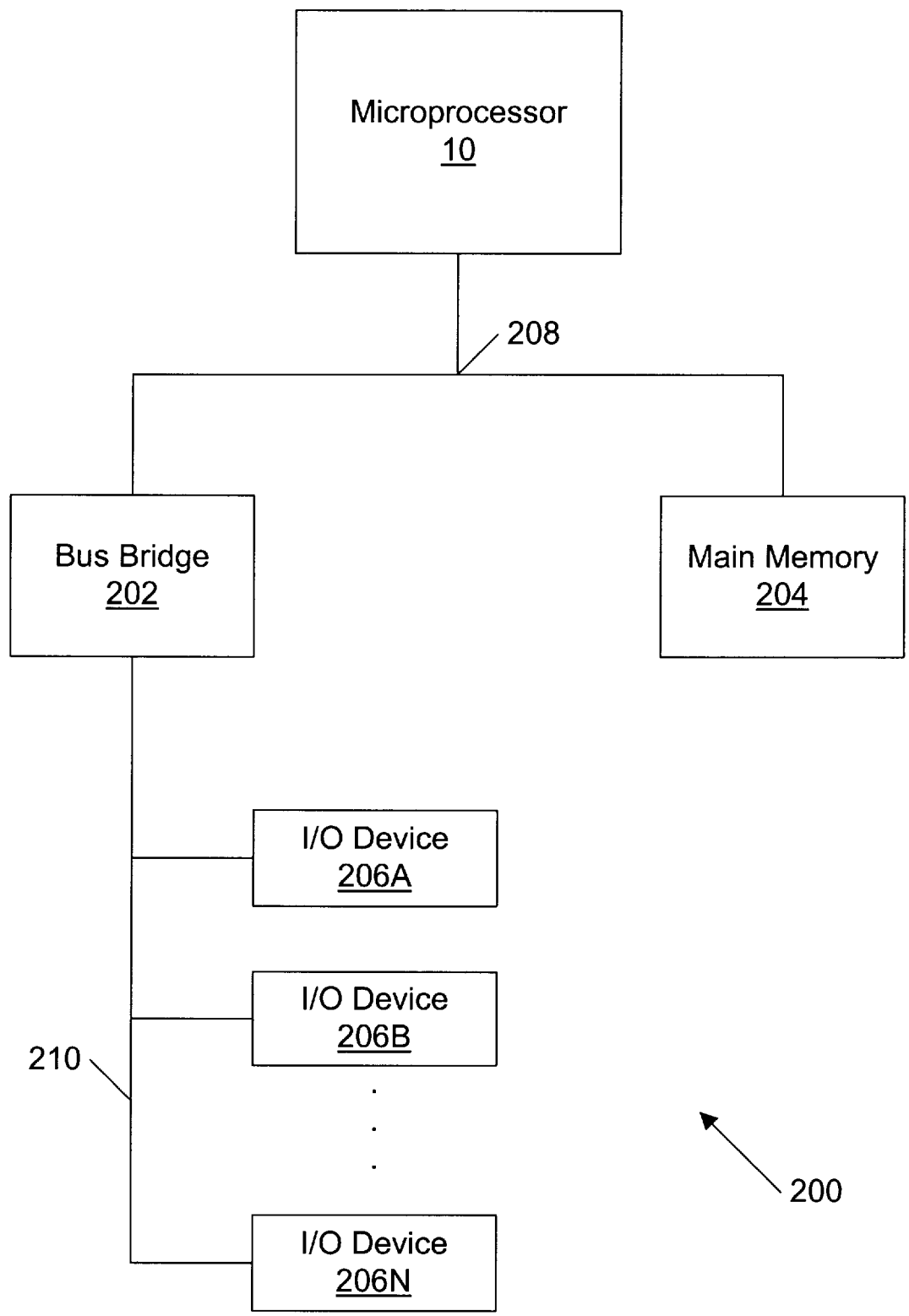
FIG. 8 is a block diagram of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that, although the x86 microprocessor architecture is used as a specific example herein, the present invention is not limited to use with the x86 microprocessor architecture. More particularly, the present invention is believed to be advantageous for any microprocessor architecture which specifies a variable length instruction set. Additionally, although microprocessor 10 as shown in FIG. 1 includes three issue positions, other embodiments of microprocessor 10 may include any number of issue positions. Accordingly, any number of shift amounts may be stored in instruction cache 16 with respect to a particular instruction cache line. Still further, the number of stored shift amounts may be greater than or less than the number of issue positions included within a particular embodiment of microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |

TABLE 1-continued x86 Fast Path, Double Dispatch, and MROM Instructions

| X86 Instruction | Instruction Category |
|---|---|
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |

TABLE 1-continued x86 Fast Path, Double Dispatch, and MROM Instructions

| X86 Instruction | Instruction Category |
|---|---|
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al., now abandoned. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran, now U.S. Pat. No. 5,619,464. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; now abandoned, "Superscalar Microprocessor Including a High Performance Instruction Alignment Unit", Ser. No. 08/377,843, filed Jan. 25, 1995 by Witt, et al; now abandoned, "A Way Prediction Structure", Ser. No. 08/522,181, filed Aug. 31, 1995 by Roberts, et al, now abandoned; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan, now abandoned; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, a microprocessor has been described which stores multiple shift amounts with each cache line of instruction bytes within an instruction cache. The shift amounts may be quickly decoded for routing instructions to issue positions, reducing the complexity and cycle time employed by an instruction alignment unit within the microprocessor. Advantageously, instructions which are members of a variable length instruction set may be quickly located within an instruction cache line. Multiple instruction dispatch may thereby be achieved, even at high clock frequencies.

Numerous variations and modifications will become apparent to those skilled in the art once the above disclosure is fully appreciated. It is intended that the following claims be interpreted to embrace all such variations and modifications.

What is claimed is:

1. A method for aligning instructions, comprising:

predecoding a cache line of instruction bytes to generate a plurality of shift amounts upon receipt of said cache line of instruction bytes for storage in an instruction cache, wherein each one of said plurality of shift amounts identifies a particular instruction within said cache line of instruction bytes;

storing said cache line of instruction bytes and said plurality of shift amounts in said instruction cache;

fetching said cache line of instruction bytes and said plurality of shift amounts from said instruction cache; and independently and concurrently selecting each of a plurality of instructions from said cache line of instructions for dispatch to a plurality of issue positions, wherein said each of said plurality of instructions is selected in response to a corresponding one of said plurality of shift amounts and independently of remaining ones of said plurality of shift amounts.

2. The method as recited in claim 1 wherein said plurality of shift amounts are equal in number to said plurality of issue positions.

3. The method as recited in claim 2 wherein a first one of said plurality of shift amounts corresponds to a first one of said plurality of issue positions, and wherein said first one of said plurality of shift amounts identifies said particular instruction which is to be dispatched to said first one of said plurality of issue positions.

4. The method as recited in claim 3 further comprising detecting that said first one of said plurality of shift amounts is numerically less than a branch target offset amount indicating an offset within said cache line of instruction bytes which is the target of a branch instruction.

5. The method as recited in claim 4 further comprising cancelling said particular instruction dispatched to said first one of said plurality of issue positions upon said detecting.

6. The method as recited in claim 1 further comprising generating an additional plurality of shift amounts wherein each of said additional plurality of shift amounts identifies an additional particular instruction within said cache line of instruction bytes.

7. The method as recited in claim 6 further comprising selecting each said additional particular instruction for dispatch based upon said additional plurality of shift amounts.

8. An apparatus for aligning instructions, comprising:

an instruction cache configured to store a cache line of instruction bytes and a corresponding plurality of shift amounts, wherein each one of said plurality of shift amounts identifies an instruction within said cache line of instruction bytes; and an instruction alignment unit coupled to receive said cache line of instruction bytes and said plurality of shift amounts upon fetch thereof from said instruction cache, wherein said instruction alignment unit is configured to independently and concurrently select each of a plurality of instructions for dispatch in response to a corresponding one of said plurality of shift amounts and independently of remaining ones of said plurality of shift amounts.

9. The apparatus as recited in claim 8 wherein each one of said plurality of shift amounts comprises an offset within said cache line of instruction bytes at which a particular instruction begins.

10. The apparatus as recited in claim 9 wherein said instruction alignment unit is coupled to receive a branch target offset identifying a particular offset within said cache line of instruction bytes which is a target of a branch instruction.

11. The apparatus as recited in claim 10 wherein said instruction alignment unit is configured to compare said branch target offset to said plurality of shift amounts.

12. The apparatus as recited in claim 11 wherein said instruction alignment unit is configured to cancel one of said plurality of instructions if a corresponding one of said plurality of shift amounts is numerically less than said branch target offset.

13. The apparatus as recited in claim 8 further comprising a predecode unit coupled to said instruction cache, wherein said predecode unit is configured to produce said plurality of shift amounts upon transmission of said cache line of instruction bytes to said instruction cache for storage.

14. The apparatus as recited in claim 8 wherein said instruction cache is further configured to store additional predecode data corresponding to said cache line of instructions, and wherein said additional predecode data includes a start bit and an end bit for each instruction byte, and wherein said start bit is indicative that said instruction byte is a beginning of an instruction, and wherein said end bit is indicative that said instruction byte is an ending of an instruction.

15. The apparatus as recited in claim 14 wherein said instruction alignment unit is coupled to received said additional predecode data, and wherein said instruction alignment unit is configured to scan said additional predecode data in order to generate additional shift amounts.

16. The apparatus as recited in claim 15 wherein said additional shift amounts are used by said instruction alignment unit during a subsequent clock cycle to select additional instructions from said cache line of instruction bytes for dispatch.

17. A microprocessor comprising:

a predecode unit configured to generate a plurality of shift amounts corresponding to a cache line of instruction bytes; p1 an instruction cache coupled to said predecode unit, wherein said instruction cache is configured to store said cache line of instruction bytes and said plurality of shift amounts; and an instruction alignment unit coupled to said instruction cache to receive said cache line of instruction bytes and said plurality of shift amounts upon fetch thereof from said instruction cache, wherein said instruction alignment unit is configured to independently and concurrently select each of a plurality of instructions from said cache line of instruction bytes for dispatch in response to a corresponding one of said plurality of shift amounts and independently of remaining ones of said plurality of shift amounts.

18. The microprocessor as recited in claim 17 wherein each of said plurality of shift amounts comprises an offset within said cache line of instructions at which an instruction begins.

19. The microprocessor as recited in claim 18 further comprising a branch prediction unit, wherein said branch prediction unit is configured to provide a branch target offset identifying a byte within said cache line of instruction bytes which is a target of a branch instruction.

20. The microprocessor as recited in claim 19 wherein said instruction alignment unit is configured to compare said branch target offset to said plurality of shift amounts and to cancel a particular instruction corresponding to one of said plurality of shift amounts if said one of said plurality of shift amounts is numerically less than said branch target offset.

21. An apparatus for aligning instructions, comprising:

an instruction cache configured to store a cache line of instruction bytes, a corresponding plurality of shift amounts, and additional predecode data, wherein each one of said plurality of shift amounts identifies an instruction within said cache line of instruction bytes, and wherein said additional predecode data includes a start bit and an end bit for each instruction byte, and wherein said start bit is indicative that said instruction byte is a beginning of an instruction, and wherein said end bit is indicative that said instruction byte is an end of an instruction; and an instruction alignment unit coupled to receive said cache line of instruction bytes and said plurality of shift amounts upon fetch thereof from said instruction cache, wherein said instruction alignment unit is configured to independently and concurrently select a plurality of instructions for dispatch in response to a corresponding one of said plurality of shift amounts and independently of remaining ones of said plurality of shift amounts.

22. The apparatus as recited in claim 21 wherein each one of said plurality of shift amounts comprises an offset within said cache line of instruction bytes at which a particular instruction begins.

23. The apparatus as recited in claim 22 wherein said instruction alignment unit is coupled to received said additional predecode data, and wherein said instruction alignment unit is configured to scan said additional predecode data in order to generate additional shift amounts.

24. The apparatus as recited in claim 23 wherein said additional shift amounts are used by said instruction alignment unit during a subsequent clock cycle to concurrently select additional instructions from said cache line of instruction bytes for dispatch.

* * * * *

UNITED STATES PATENT AND TRADEMARK OFFICE
CERTIFICATE OF CORRECTION

PATENT NO. : 5,872,943

DATED : February 16, 1999

INVENTOR(S) : James K. Pickett and Thang M. Tran

It is certified that error appears in the above-identified patent and that said Letters Patent is hereby corrected as shown below:

In the Claims:

Claim 17, col. 21, line 39, please delete "p1". The words "an instruction cache" begin a new paragraph.

Signed and Sealed this

Second Day of November, 1999

Attest:

Q. TODD DICKINSON

*Attesting Officer*   Acting Commissioner of Patents and Trademarks